(12) United States Patent
Wideman et al.

(10) Patent No.: US 6,495,619 B1
(45) Date of Patent: Dec. 17, 2002

(54) RUBBER COMPOSITION PREPARED WITH CIS-1,4-POLYISOPRENE AND PHTHALIMIDE DISULFIDE AND ARTICLES, INCLUDING TIRES, HAVING AT LEAST ONE COMPONENT COMPRISED THEREOF

(75) Inventors: Lawson Gibson Wideman, Hudson, OH (US); Paul Harry Sandstrom, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 321 days.

(21) Appl. No.: 09/662,082

(22) Filed: Sep. 14, 2000

(51) Int. Cl.$^7$ .............................. C08K 5/34; C08K 5/48
(52) U.S. Cl. ....................................................... 524/94
(58) Field of Search ............................................ 524/94

(56) References Cited

U.S. PATENT DOCUMENTS 4,017,489 A * 4/1977 Lawrence ................ 260/243 B
6,096,832 A * 8/2000 Materne et al. .......... 525/332.7

* cited by examiner

*Primary Examiner*—Peter D. Mulcahy
(74) *Attorney, Agent, or Firm*—Henry C. Young, Jr.

(57) ABSTRACT

This invention relates to rubber compositions prepared with cis-1,4-polyisoprene, particularly natural rubber, and phthalimide disulfide and to articles of manufacture having at least one component comprised thereof, including tires. The phthalimide disulfide has been observed to enhance stiffness of natural rubber based rubber compositions.

20 Claims, No Drawings

RUBBER COMPOSITION PREPARED WITH CIS-1,4-POLYISOPRENE AND PHTHALIMIDE DISULFIDE AND ARTICLES, INCLUDING TIRES, HAVING AT LEAST ONE COMPONENT COMPRISED THEREOF

FIELD OF THE INVENTION

This invention relates to rubber compositions prepared with cis-1,4-polyisoprene, particularly natural rubber, and phthalimide disulfide and to articles of manufacture having at least one component comprised thereof, including tires. The phthalimide disulfide has been observed to enhance stiffness of natural rubber based rubber compositions.

BACKGROUND OF THE INVENTION

Rubber compositions are often prepared which are based upon or contain significant amounts of cis 1,4-polyisoprene rubber.

However, it is believed to generally recognized that cis 1,4-polyisoprene rubber, particularly natural cis 1,4-polyisoprene rubber, does not provide adequate stiffness to a rubber composition for many uses without addition of additional modulus enhancing materials to enhance the stiffness of the cured rubber composition.

Indeed, where stiffness of a natural rubber based rubber composition is a desired property, such as for example E' stiffness for improved handling in tires, an increased stiffness of the rubber composition may be enhanced by use of bis maleimide crosslinking cure agents.

However, excessive use of crosslinking agents to enhance stiffness of the cured rubber composition may not always be desirable because the rubber becomes too hard and brittle.

In certain practical applications such as handling properties of tires (e.g. vehicular cornering ability), stiffness of the vulcanized rubber composition is important in promoting the durability of the respective rubber component of the tire, where stiffness of the tire (e.g. a tire tread) may promote better control of the associated vehicle.

Increased stiffness of a sulfur vulcanized rubber compound often manifests itself (or is evidenced by) increased modulus values. Therefore, stiffer rubber compounds may be desirable for increased rubber properties in order to attain improved handling in tires.

In the description of this invention, the term "phr" is used to designate parts by weight of a material per 100 parts by weight of elastomer. In the further description, the terms "rubber" and "elastomer" may be used interchangeably unless otherwise mentioned. The terms "vulcanized" and "cured" may be used interchangeably, as well as "unvulcanized" or "uncured", unless otherwise indicated.

SUMMARY AND PRACTICE OF THE INVENTION

In accordance with this invention, a rubber composition is provided which is based upon cis-1,4-polyisoprene elastomer which contains from about 0.1 to about 10 phr of phthalimide disulfide. The cis-1,4-polyisoprene elastomer may be natural or synthetic cis-1,4-polyisoprene elastomer.

It is to be appreciated that such rubber composition may contain other conjugated diene-based elastomers, so long as the cis 1,4-polyisoprene rubber is present in an amount of at least about 25 phr and alternately at least 50 phr, such as for example homopolymers and copolymers of isoprene (other than cis-1,4-polyisoprene) and 1,3-butadiene and copolymers of isoprene and 1,3-butadiene with a vinyl aromatic compound such as styrene and/or alphamethyl styrene, preferably styrene.

In further accordance with this invention, a rubber composition is provided which comprises, based upon 100 parts by weight elastomers (phr), (A) 100 phr of unvulcanized conjugated diene based elastomers comprised of
  (1) about 25 to about 100, alternately about 50 to about 75, phr of cis-1,4-polyisoprene elastomer and, correspondingly
  (2) from zero to about 75, alternately about 25 to about 50, phr of at least one additional conjugated diene-based elastomer, and (B) about 0.1 to about 10, alternately about 1 to about 5, phr of phthalimide disulfide.

While the mechanism may not be entirely understood, it is believed that mixing the phthalimide disulfide with the unvulcanized synthetic cis-1,4-polyisoprene elastomer and ultimately sulfur vulcanizing the rubber composition results in an enhanced stiffness of the rubber composition in that the sulfur-to-sulfur and sulfur-to-nitrogen bonds of the phthalimide disulfide can lead to selective crosslinking not attained with sulfur alone.

The resulting rubber compositions may be used as various components of articles of manufacture, particularly various components of tires such as, for example, tire treads where tire durability and handling are often desirable aspects of tires.

In further accordance with this invention, an article of manufacture is provided which contains at least one component which is comprised of the rubber composition of this invention.

In additional accordance with this invention, a tire is provided which contains at least one component which is comprised of the rubber composition of this invention.

In further accordance with this invention, a tire is provided which contains at least one component selected from at least one of a tread, sidewall, carcass ply and apex which is comprised of the rubber composition of this invention.

In additional accordance with this invention, a tire is provided having a tread comprised of the rubber composition of this invention.

In the practice of this invention, as hereinbefore pointed out, the rubber composition of this invention may contain at least one additional diene-based elastomer. Thus, it is considered that the elastomer is a sulfur curable elastomer.

The additional diene based elastomer may be selected, for example, from homopolymers and copolymers of at least one diene selected from isoprene and 1,3-butadiene (other than the aforesaid natural and synthetic cis-1,4-polyisoprene) and copolymers of at least one diene selected from isoprene and 1,3-butadiene with a vinyl aromatic compound selected from at least one of styrene and alphamethyl styrene, preferably styrene.

Representative of such additional elastomers are, for example, at least one of styrene/butadiene copolymer rubbers (aqueous emulsion polymerization derived and organic solvent solution polymerization derived), isoprene/butadiene copolymer rubbers, styrene/isoprene copolymer rubbers, styrene/isoprene/butadiene terpolymer rubbers, cis-1,4-polybutadiene rubber, high vinyl polybutadiene rubber with a vinyl 1,2-content in a range of about 30 to about 90 percent, emulsion polymerization prepared butadiene/acrylonitrile copolymers and a minor amount of 3,4-polyisoprene rubber.

In the further practice of this invention, particulate reinforcement for the rubber composition may be one or more of rubber reinforcing carbon black, synthetic amorphous silica and silica treated carbon black having silica domains on its surface, usually in an amount in a range of about 35 to about 100 alternately about 35 to about 90, phr. If a combination of carbon black and silica is used, usually at least about 5 phr of carbon black and at least 10 phr of silica is used. For example, a weight ratio of silica to carbon black ranging from about 1/5 to 5/1 might be used.

Commonly employed amorphous silica, or siliceous pigments, used in rubber compounding applications can be used as the silica in this invention, including pyrogenic and precipitated siliceous pigments are precipitated and fumed silica wherein precipitated silicas are usually preferred.

The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 $cm^3/100$ g, and more usually about 100 to about 300 $cm^3/100$ g.

Various commercially available silicas may be considered for use in this invention such as, only for example herein, and without limitation, silicas commercially available from PPG Industries under the Hi-Sil trademark with designations 210, 243, etc; silicas available from Rhodia as, for example, Zeosil 1165MP and Zeosil 165GR, silicas available from Degussa AG with, for example, designations VN2 and VN3, as well as other grades of silica, particularly precipitated silicas, which can be used for elastomer reinforcement.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily directed to the utilization of phthalimide disulfide in a cis 1,4-polyisoprene rubber, particularly natural rubber, based rubber composition.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, starch-based material, and fillers such as carbon black and optional silica and coupler, and/or non-carbon black and non-silica fillers, are mixed in one or more non-productive mix stages. The terms "non-productive" and "productive" mix stages are well known to those having skill in the rubber mixing art.

The following examples are presented to illustrate the invention and are not intended to be limiting. The parts and percentages are by weight unless otherwise designated.

EXAMPLE I

To a one liter round bottom flask was added a solution of 100 grams (0.54 mole) of potassium phthalimide in 500 ml of N,N-dimethylformamide (DMF) which had been dried with an excess of type-y molecular sieves. The solution was stirred in the flask at a temperature of about 23° C. (room temperature) under an atmosphere of nitrogen gas for about 30 minutes.

A dropping funnel was attached to the flask and charged, under a nitrogen gas atmosphere, with 36.4 grams (0.27 mole) of sulfur monochloride ($S_2Cl_2$). In particular, the sulfur monochloride was slowly added to the stirred solution in the flask and the temperature of the flask contents held to a temperature of about 25° C. to about 28° C. by externally cooling the flask with wet ice.

After about 0.5 hours for the sulfur monochloride addition, the reaction mixture in the flask was stirred for an additional period of about 6 hours at which time the mixture was filtered and the resultant product extracted with 2000 ml of hot chloroform to yield 28.7 grams of white needles melting at about 194° C. to about 216° C. Mass spectrometric analysis of the recovered product (the white needles) confirmed the structure of phthalimide disulfide.

EXAMPLE II

A rubber composition comprised of an unvulcanized synthetic cis-1,4-polyisoprene elastomer, namely natural rubber, was prepared by blending the unvulcanized synthetic cis-1,4-polyisoprene elastomer in an internal rubber mixer with the phthalimide disulfide of Example I for a period of about 3 minutes to a temperature of about 160° C. as represented by Sample B and illustrated in the following Table 1.

Sample A is presented as a Control Sample in which the unvulcanized synthetic cis-1,4-polyisoprene rubber is not blended with the phthalimide disulfide.

TABLE 1

| | Parts | |
|---|---|---|
| Material | Sample A Control | Sample B |
| Non-Productive Mixing Step (3 minutes to 160° C.) | | |
| Cis-1,4-polyisoprene[1] | 100 | 100 |
| Carbon black[2] | 50 | 50 |
| Processing oil[3] | 5 | 5 |
| Zinc oxide | 5 | 5 |
| Antioxidant[4] | 2 | 2 |
| Stearic acid | 2 | 2 |
| Phthalimide disulfide[5] | 0 | 2 |
| Productive Mixing Step (2 minutes to 108° C.) | | |
| Accelerator, sulfenamide | 1.5 | 1.5 |
| Sulfur | 1.4 | 1.4 |

[1]Synthetic cis-1,4-polyisoprene obtained as NAT 2200 from The Goodyear Tire & Rubber Company
[2]N330 carbon black, an ASTM designation
[3]Obtained as Flexon 641 from Exxon Chemical Company
[4]Quinoline type
[5]According to Example I herein Various physical properties of the rubber compositions of Table 1 were evaluated and reported in the following Table 2.

TABLE 2

| | Parts | |
|---|---|---|
| Properties | Sample A Control | Sample B |
| Vulcanized Properties (36 minutes at 150° C.) Rheometer | | |
| T90 | 12.3 | 13.5 |
| Torque min (dNm) | 8.3 | 7.8 |
| Torque max (dNm) | 38.6 | 37.5 |
| Delta Torque (dNm) | 30.3 | 29.7 |
| Modulus, MPa | | |
| 100% | 2.12 | 2.44 |
| 300% | 11.4 | 12.8 |
| Ult Tensile strength (MPa) | 24 | 24.5 |
| Ult Elongation (%) | 553 | 533 |
| Hardness (Shore A) | | |
| 23° C. | 63.5 | 66.8 |
| 100° C. | 57.4 | 58.6 |
| Rebound, % | | |
| 23° C. | 47.5 | 46.4 |
| 100° C. | 63.3 | 62.6 |
| Tear resistance 95° C., N | 142 | 117 |
| DIN Abrasion[1] | 113 | 111 |
| E' (60° C.), MPa | 16.1 | 16.4 |
| Tan delta (60° C.) | 0.082 | 0.075 |

[1]Relative volume loss whereas a lower value represents a lower volume loss and therefor a better resistance to abrasion.

It can be seen from Table 2 that the cured modulus at 100 percent and 300 percent elongation and hardness values at 23° C. and 100° C. are increased when phthalimide disulfide is present. This is considered herein to be significant because the increased modulus and hardness values will provide improved durability and handling characteristics when used in a tire tread composition. The reduced tan delta value at 60° C. is also indicative of a cooler running tread compound.

While various embodiments are disclosed herein for practicing the invention, it will be apparent to those skilled in this art that various changes and modifications may be made therein without departing from the spirit or scope of the invention.

What is claimed is:

1. A rubber composition comprised of cis-1,4-polyisoprene which contains from about 0.1 to about 10 phr of phthalimide disulfide, wherein said cis-1,4-polyisoprene is selected from at least one of natural and synthetic cis-1,4-polyisoprene rubber.

2. The rubber composition of claim 1 wherein said cis-1,4-polyisoprene is synthetic cis-1,4-polyisoprene.

3. The rubber composition of claim 1 which comprises, based upon 100 parts by weight elastomers (phr),
   (A) 100 phr of unvulcanized conjugated diene based elastomers comprised of
      (1) about 25 to about 100 phr of cis- 1,4- polyisoprene elastomer and, correspondingly
      (2) from zero to about 75 phr of at least one additional conjugated diene-based elastomer, and
   (B) about 0.1 to about 10 phr of phthalimide disulfide.

4. The rubber composition of claim 1 which comprises, based upon 100 parts by weight elastomers (phr),
   (A) 100 phr of unvulcanized conjugated diene based elastomers comprised of
      (1) about 50 to about 75 phr of cis-1,4- polyisoprene elastomer and, correspondingly
      (2) about 25 to about 50, phr of at least one additional conjugated diene-based elastomer, and
   (B) about 1 to about 5, phr of phthalimide disulfide.

5. The rubber composition of claim 3 wherein said cis-1,4-polyisoprene is comprised synthetic cis-1,4-polyisoprene.

6. The rubber composition of claim 1 wherein said additional diene-based elastomer is selected from homopolymers and copolymers of at least one diene selected from isoprene and 1,3-butadiene (other than said natural and synthetic cis-1,4-polyisoprene elastomers) and copolymers of at least one diene selected from isoprene and 1,3-butadiene with a vinyl aromatic compound selected from at least one of styrene and alphamethyl styrene.

7. The rubber composition of claim 6 wherein said additional diene based elastomer is selected from at least one of styrene/butadiene copolymer rubbers (aqueous emulsion polymerization derived and organic solvent solution polymerization derived elastomers), isoprenelbutadiene copolymer rubbers, styrene/isoprene copolymer rubbers, styrene/isoprene/butadiene terpolymer rubbers, cis-1,4-polybutadiene rubber, high vinyl polybutadiene rubber with a vinyl 1,2- content in a range of about 30 to about 90 percent, emulsion polymerization prepared butadiene/acrylonitrile copolymers and a minor amount of 3,4-polyisoprene rubber.

8. The rubber composition of claim 6 which contains at least two of said additional conjugated diene-based based elastomers.

9. The rubber composition of claim 1 which contains particulate reinforcement for said rubber composition in an amount of about 35 to about 100 phr wherein said reinforcement is comprised of at least one of rubber reinforcing carbon black, synthetic amorphous silica and silica treated carbon black which contains silica domains on its surface.

10. The rubber composition of claim 1 which contains particulate reinforcement for said rubber composition wherein said reinforcement is comprised of at least one of rubber reinforcing carbon black and amorphous silica in an amount in a range of about 35 to about 100 phr thereof.

11. An article of manufacture which contains at least one component which is comprised of the rubber composition of claim 1.

12. An article of manufacture which contains at least one component which is comprised of the rubber composition of claim 3.

13. A tire which contains at least one component which is comprised of the rubber composition of claim 1.

14. A tire which contains at least one component which is comprised of the rubber composition of claim 3.

15. The tire of claim 12 where said component is selected from at least one of a tread, sidewall, carcass ply and apex.

16. The tire of claim 13 where said component is selected from at least one of a tread, sidewall, carcass ply and apex.

17. A tire having a tread comprised of the rubber composition of claim 1.

18. A tire having a tread comprised of the rubber composition of claim 3.

19. A tire having a tread comprised of the rubber composition of claim 4.

20. A tire having a tread comprised of the rubber composition of claim 5.

* * * * *